US011252865B2

(12) United States Patent
Bissonnette

(10) Patent No.: US 11,252,865 B2
(45) Date of Patent: Feb. 22, 2022

(54) APPARATUS AND METHODS FOR REVITALIZING ARTIFICIAL TURF FIELDS

(71) Applicant: Tarkett Inc., Farnham (CA)

(72) Inventor: Alain Bissonnette, Farnham (CA)

(73) Assignee: TARKETT INC., Quebec (CA)

( * ) Notice: Subject to any disclaimer, the term of this patent is extended or adjusted under 35 U.S.C. 154(b) by 0 days.

(21) Appl. No.: 16/860,067

(22) Filed: Apr. 28, 2020

(65) Prior Publication Data

US 2020/0253112 A1 Aug. 13, 2020

Related U.S. Application Data

(63) Continuation of application No. 15/608,881, filed on May 30, 2017, now Pat. No. 10,645,870.

(Continued)

(51) Int. Cl.
*A01D 34/03* (2006.01)
*A01D 34/37* (2006.01)
(Continued)

(52) U.S. Cl.
CPC ......... *A01D 34/037* (2013.01); *A01D 34/032* (2013.01); *A01D 34/37* (2013.01); *A01D 34/404* (2013.01); *E01C 13/08* (2013.01)

(58) Field of Classification Search
CPC ...... A01D 34/13; A01D 34/037; A01D 34/37; A01D 34/032; A01D 34/404; E01C 13/08
See application file for complete search history.

(56) References Cited

U.S. PATENT DOCUMENTS

| 887,461 A | 5/1908 | Card |
| 1,902,928 A * | 3/1933 | Worthington ........ A01D 75/306 56/7 |

(Continued)

FOREIGN PATENT DOCUMENTS

| CN | 202160424 U | 3/2012 |
| EP | 0098627 A1 | 1/1984 |

(Continued)

OTHER PUBLICATIONS

"Repair a Damaged Carpet" Besser, Robert, Feb. 28, 2006, 1 page Currently accessible at http://voices.yahoo.com/repair-damaged-carpet-16254.html and http://voices.yahoo.com/ shared/pring.shtml?content_type=articles&content_type id=19890 Previously accessible at http:/fwww.associatedcontent.com/article/19890/repair_a_damaged_carpet.html.

(Continued)

*Primary Examiner* — Thomas B Will
*Assistant Examiner* — Joel F. Mitchell
(74) *Attorney, Agent, or Firm* — Walter Haverfield LLP; James J. Pingor

(57) ABSTRACT

Apparatus and methods that use shearing machines operate to revitalize artificial turf fields. In one exemplary apparatus, the apparatus may comprise a support frame, a plurality of shearing machines installed on the support frame, and a plurality of wheels installed on the support frame. The support frame may be configured to position the shearing machines parallel to each other, to tilt the shearing machines with respect a surface of the artificial turf field, and to position the shearing machines above a surface of the field at a distance such that the shearing machines cut fibers to produce trimmed fibers that have a length that can extend above infill or topmost layer of the artificial turf field.

9 Claims, 9 Drawing Sheets

Related U.S. Application Data

(60) Provisional application No. 62/344,333, filed on Jun. 1, 2016.

(51) Int. Cl.
  *E01C 13/08* (2006.01)
  *A01D 34/404* (2006.01)

(56) References Cited

U.S. PATENT DOCUMENTS

| | | | |
|---|---|---|---|
| 1,943,675 A | | 1/1934 | Jocobsen |
| 2,026,291 A | * | 12/1935 | Tirimacco ............. A01D 34/02 56/13.3 |
| 2,155,183 A | | 4/1939 | Dursch |
| 2,316,475 A | * | 4/1943 | Viken .................... A01D 57/20 56/181 |
| 2,401,513 A | | 8/1946 | Schmidt |
| 2,710,517 A | | 4/1955 | Huddon |
| 2,733,565 A | * | 2/1956 | Kearney ................ A01D 34/02 56/17.6 |
| 2,826,034 A | | 3/1958 | Feuerlein |
| 3,070,938 A | * | 1/1963 | Winget ................. A01D 75/306 56/6 |
| 3,085,385 A | * | 4/1963 | Hansen et al. ......... A01D 34/86 56/7 |
| 3,650,096 A | * | 3/1972 | Caldwell ............. A01B 73/044 56/7 |
| 4,697,404 A | * | 10/1987 | Brockmeier et al. ... A01D 75/30 172/308 |
| 4,711,004 A | | 12/1987 | Van Dijk |
| 4,882,818 A | | 11/1989 | Weathers et al. |
| 5,146,733 A | * | 9/1992 | Klaeger ................ A01D 75/30 56/10.4 |
| 5,463,857 A | | 11/1995 | Blosser |
| 5,497,603 A | | 3/1996 | Short |
| 5,540,960 A | | 7/1996 | Geerts |
| 5,662,531 A | | 9/1997 | Durso |
| 5,958,527 A | | 9/1999 | Prevest |
| 6,035,577 A | | 3/2000 | Motz et al. |
| 6,112,680 A | | 9/2000 | Hummer |
| 6,145,248 A | | 11/2000 | Bergevin |
| 6,263,616 B1 | | 7/2001 | Hummer |
| 6,295,756 B1 | | 10/2001 | Bergevin |
| 6,427,429 B1 | * | 8/2002 | Brabenec .............. A01D 34/76 56/12.7 |
| 6,620,482 B2 | | 9/2003 | Carr et al. |
| 6,691,455 B1 | | 2/2004 | Bergevin |
| 6,794,007 B2 | | 9/2004 | Carr et al. |
| 6,886,317 B2 | | 5/2005 | Jackson et al. |
| 6,945,007 B2 | | 9/2005 | Kobayashi et al. |
| 6,989,037 B2 | | 1/2006 | Brown et al. |
| 6,990,703 B2 | | 1/2006 | Brown et al. |
| 7,175,362 B2 | | 2/2007 | Carr et al. |
| 7,198,427 B2 | | 4/2007 | Carr et al. |
| 7,543,434 B2 | | 6/2009 | Jackson et al. |
| 7,806,625 B2 | | 10/2010 | Carr et al. |
| 7,901,154 B2 | | 3/2011 | Carr et al. |
| 8,388,764 B2 | | 3/2013 | Jonsson |
| 8,464,801 B2 | | 6/2013 | Bearden |
| 8,490,371 B2 | * | 7/2013 | Roberge ................ A01D 34/78 56/10.2 R |
| 8,771,434 B2 | | 7/2014 | Mitchell |
| 9,010,450 B2 | | 4/2015 | Motz et al. |
| 9,043,961 B2 | | 6/2015 | Gil |
| 9,045,071 B2 | | 6/2015 | Nicholls et al. |
| 9,259,861 B2 | | 2/2016 | Mashburn |
| 9,422,129 B2 | | 8/2016 | Motz et al. |
| 2002/0031636 A1 | | 3/2002 | Brown et al. |
| 2002/0074075 A1 | | 6/2002 | Brown et al. |
| 2003/0037508 A1 | | 2/2003 | Kobayashi et al. |
| 2003/0099787 A1 | | 5/2003 | Fink |
| 2003/0106949 A1 | | 6/2003 | Stroppiana |
| 2003/0203116 A1 | | 10/2003 | Brown et al. |
| 2004/0144075 A1 | | 7/2004 | Jackson et al. |
| 2004/0148917 A1 | * | 8/2004 | Eastwood .............. A01D 69/02 56/6 |
| 2005/0044656 A1 | | 3/2005 | Prevost |
| 2005/0188666 A1 | | 9/2005 | Jackson et al. |
| 2005/0250421 A1 | | 11/2005 | Monko, Sr. |
| 2007/0237921 A1 | | 10/2007 | Knapp et al. |
| 2010/0001115 A1 | | 1/2010 | Jonsson |
| 2010/0030709 A1 | | 2/2010 | Carr |
| 2010/0151158 A1 | | 6/2010 | Mashburn et al. |
| 2010/0247814 A1 | | 9/2010 | Nisikawa et al. |
| 2010/0319510 A1 | | 12/2010 | Bearden |
| 2011/0189408 A1 | | 8/2011 | Ishimaru et al. |
| 2012/0031814 A1 | | 2/2012 | Hinkel |
| 2012/0263891 A1 | | 10/2012 | Rodgers |
| 2012/0315816 A1 | | 12/2012 | Fowler et al. |
| 2013/0017023 A1 | | 1/2013 | Nicholls et al. |
| 2013/0064996 A1 | | 3/2013 | Mashburn |
| 2013/0189057 A1 | | 7/2013 | Motz et al. |
| 2013/0192633 A1 | | 8/2013 | Gil |
| 2013/0280445 A1 | | 10/2013 | McAnany et al. |
| 2013/0330156 A1 | | 12/2013 | Motz et al. |
| 2016/0100523 A1 | * | 4/2016 | Anderson ............. A01D 34/73 56/6 |

FOREIGN PATENT DOCUMENTS

| | | |
|---|---|---|
| JP | H04120306 A | 4/1992 |
| JP | 2001336111 A | 12/2001 |
| JP | 2002335761 A | 11/2002 |
| JP | 2005220514 A | 8/2005 |
| JP | 2008285879 A | 11/2008 |
| KR | 10-2009-0124411 A | 12/2009 |
| WO | WO0059291 A1 | 10/2000 |
| WO | WO0025567 A1 | 5/2002 |
| WO | WO02076560 A2 | 10/2002 |
| WO | WO02103115 A1 | 12/2002 |

OTHER PUBLICATIONS

"Ice & Inline—High Fiber Diet" Steinbach, Paul, Nov. 1, 2005, 7 pages accessible at http:/athleticbusiness.com/articles/article.aspx?articleid=1105&zoneid=24.

"Synthetic Turf in the USA—Trends and Issues" McNitt, A.S., International Turfgrass Society Research Journal vol. 10, 2005, pp. 27-33 D /CJ/ accessible at http://ssrc.psu.edu/pdf/synthetic_turf_usa.pdf.

International Search Report and Written Opinion for related International Application No. PCT/US2011/045591 dated Dec. 13, 2011, 12 pages.

English translation of KR 2009-0124411, Dec. 2009 (3 pages).

English Translation of Japanese Office Action, Application No. 2014-506395 dated Apr. 28, 2015 (11 Pages).

* cited by examiner

APPARATUS AND METHODS FOR REVITALIZING ARTIFICIAL TURF FIELDS

CROSS-REFERENCE TO RELATED APPLICATIONS

This application is a continuation of U.S. application Ser. No. 15/608,881, filed May 30, 2017, which claims the benefit of U.S. Provisional Application 62/344,333, filed on Jun. 1, 2016, the entirety of which is herein incorporated by reference.

FIELD OF THE INVENTION

The present invention is related to artificial turf fields and more particularly to apparatus and methods for revitalizing such a field as a result of damage over time.

BACKGROUND OF THE INVENTION

The present application generally relates to apparatus and methods for revitalizing artificial turf fields, and in particular to apparatus and methods for cutting a portion of the fiber height.

Artificial turf fields provide many advantages and have become a popular option for stadium and other athletic fields. The installation of artificial fields can involve significant work and capital contributions. The installed fields will generally be durable and have an extended life span. Even so, fields will have an expected operation life until which time the quality of the fibers will degrade. This can lead to both aesthetic and performance issues with the turf. Replacing the entire field can again lead to significant work and capital contribution. The standard approach in the past has been to replace the field or in some cases, replace a section of the field. The latter can require cutting the fiber entirely down to the backing and replacing that section with newly tufted backing material. A recent approach to addressing these issues proposes a revitalizing process in which the fibers on the field are cut to a length that extends above a certain level, such as the level of the infill material. This approach can remove worn or damaged portions of the fiber at the tip of the fiber, above the infill. The trimmed fibers can provide a "renewed" turf field, in conjunction with potential adjustments to the height of the infill.

Currently, there is very little, if any, equipment that is configured to support this operation. The applicant has spent significant time and resources in research and development directed to developing such equipment. Many considerations affect this process. For example, artificial turf is not the same natural grass. It has different physical properties and the equipment would need to effectively operate to address this distinction. For another example, equipment too big may make it difficult to maneuver and operate and equipment too small may require more effort to revitalize the entire field.

The present invention is directed to solving these and other issues.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

DETAILED DESCRIPTION OF THE INVENTION

Figure 1:
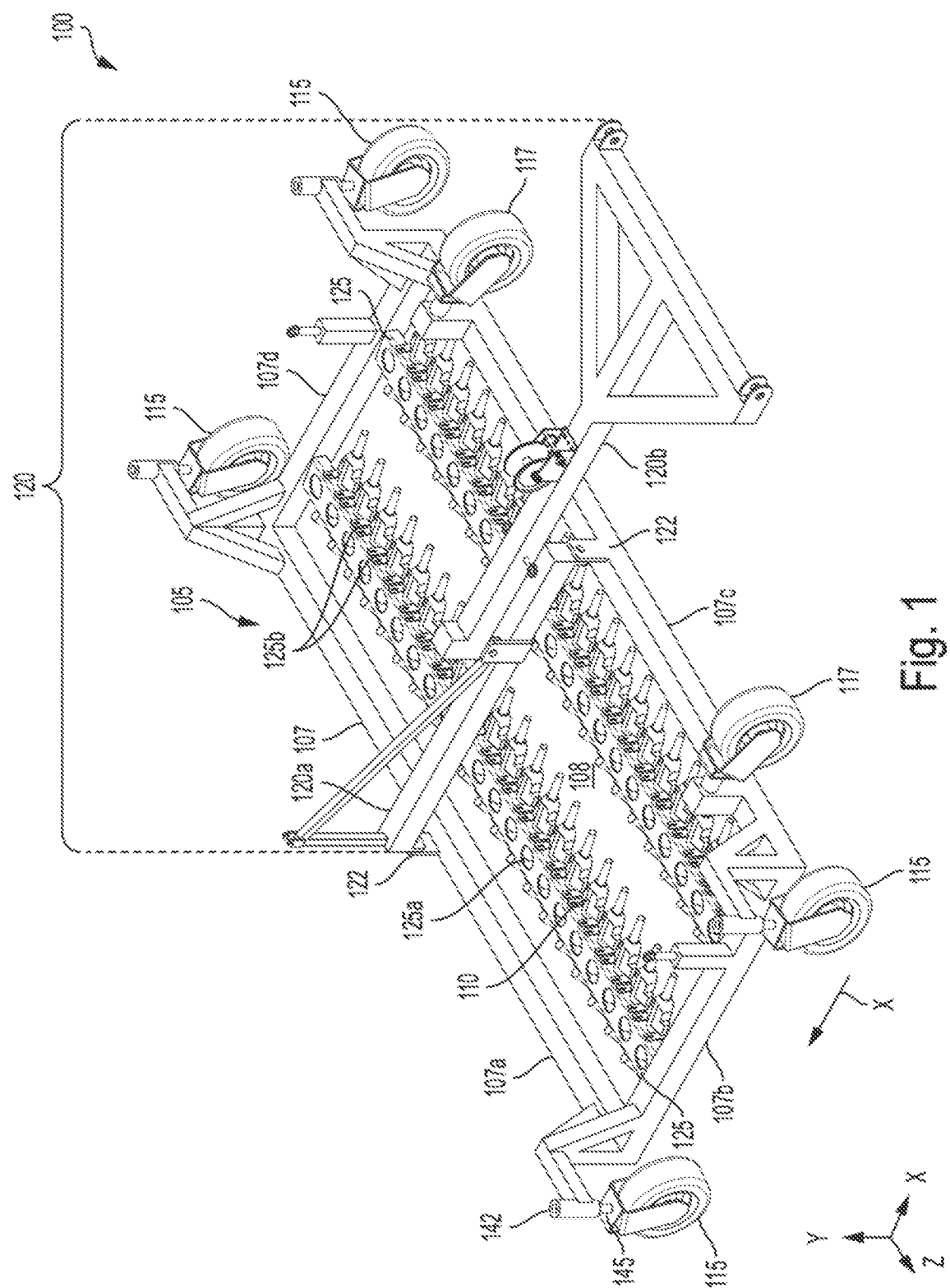
FIG. 1 depicts one embodiment of the apparatus for revitalizing artificial turf fields in accordance with some embodiments of the present invention.

Based on research and development conducted by the applicant, new apparatus and methods have been developed for revitalizing artificial turf fields. FIG. 1 illustrates one embodiment of the apparatus 100 for revitalizing artificial turf fields. The apparatus 100 may comprise a support frame 105, a plurality of shearing machines 110 installed on the support frame in two rows, a plurality of wheels 115, 117 installed on the support frame, and an attachment member 120 installed on the support frame. The apparatus 100 may be connected to a vehicle (e.g., tractor) via the attachment member 120 and be moved by the vehicle. The apparatus 100 may be pushed by the vehicle in a mowing direction X to revitalize an artificial turf field. The apparatus 100 may also be pushed in the mowing direction X by individual(s). The apparatus 100 removes a portion of the fibers on the artificial turf field via the plurality of shearing machines 100 while it rolls on the field. The trimmed fibers may provide a renewed artificial turf field.

The support frame 105 may comprise a base 107. The base 107 may comprise a first beam 107a, a second beam 107b perpendicular to the first beam 107a, a third beam 107c perpendicular to the second beam 107b and parallel to the first beam 107a, and a fourth beam 107d perpendicular to the first beam 107a and the third beam 107c and parallel to the second beam 107b. The beams 107a-107d may form a rectangular or square shape. The beams 107a-107d may define an empty space or a hollow space 108.

The support frame 105 may also comprise two struts 125. The struts may be installed in the base 107. The struts 125 may extend between the second beam 107b and the fourth beam 107d. The struts 125 may be perpendicular to the second beam 107b and the fourth beam 107d and parallel to the first beam 107a and the third beam 107c. The struts 125 may be installed in the hollow space 108. The struts 125 may be spaced from each other and from the first beam 107a and the second beam 107c.

Figure 2:
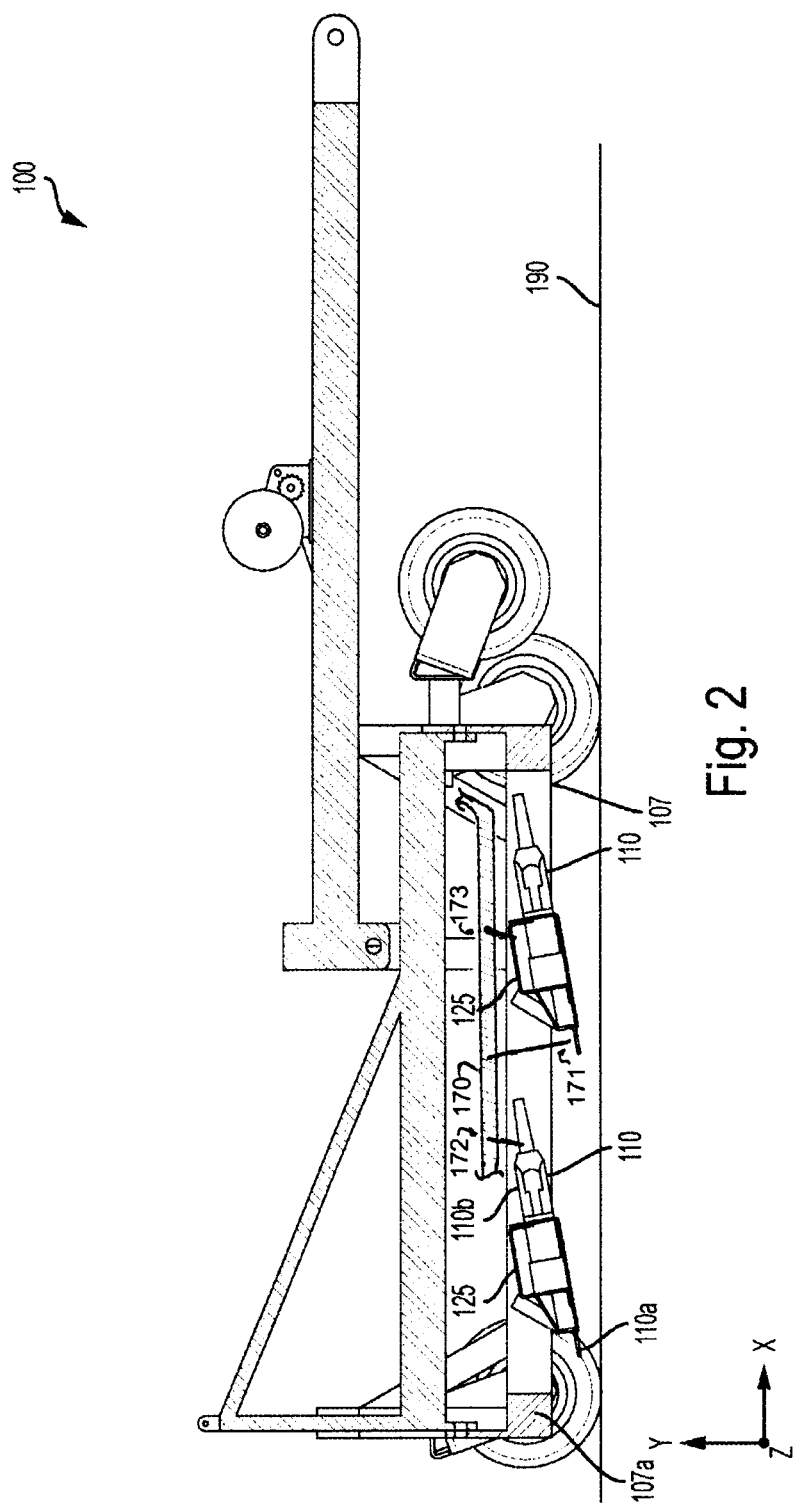
FIG. 2 depicts a cross-sectional view of the apparatus for revitalizing artificial turf fields in accordance with some embodiments of the present invention.

The struts 125 may be adjustable on the base 107 to different heights with respect to the ground or the artificial turf field. Each strut 125 may be adjusted to the same height or different heights. The struts 125 may be installed below the attachment member 120. Each of the struts 125 may be configured to allow the shearing machines 110 be inserted through the strut 125 and be attached to the strut 125. The shearing machines 110 may be inserted through the strut 125 in a direction from the third beam 107c toward the first beam 107a. FIG. 2 depicts a cross-sectional view of the apparatus 100 and it shows the shearing machines 110 inserted through the strut 125 and attached to the strut 125. The attached shearing machines 110 may be tilted with respect to the surface of the field 190 or the base 107. The attached shearing machines 110 may form two rows of shearing machines parallel to each other. In one embodiment, one row may be about 8 feet long. All the shearing machines on one row may be aligned with respect to each other and tilted at the same angle. The tilted angle may be an angle between the shearing machines and the surface of the field. More specifically, the angle is measured by the direction of comb/cutter (the line formed by the flat shape of the comb/cutter) on the machine relative to the surface (flat plane of the surface) of the ground. The angle may range between and including 7 and 13 degrees, with the preferred angle being 10 degrees, which was found to provide the best performance. All the shearing machines 100 on another row may also be aligned with respect to each other and they may be tiled at the same angle as the shearing machines on the former row. The two rows of shearing machines may be separated from each other at a distance. The two rows of shearing machines are also separated from both the first beam 107a and the third 107c beam at a distance. The two rows of shearing machines are perpendicular to the second beam 107b and the fourth beam 107d. Each shearing machine 110 on each row is also separated from adjacent shearing machines at a distance. The distance is preferably less than the cutting width of the cutting mechanism. Each shearing machine 100 on each row may be separated from adjacent shearing machines such that there is an empty space in between. Each cutting mechanism of the shearing machines on the row with less shearing machines (first row) may be placed between the cutting mechanisms of the shearing machines on the row with more shearing machines (second row) such that a portion of each cutting mechanism on the first row overlaps a cutting mechanism on the second row adjacent to the cutting mechanism on the first row. In this way, no uncut turf is left behind. The overlapping portion preferably has a measurement of 1.5 inch.

For example, each cutting mechanism of the shearing machines on the first and second row has a cutting width of 5 inches and adjacent shearing machines on the second row are arranged to be 2 inches apart. Each cutting mechanism on the first row is positioned behind the 2-inch space such that a portion of that cutting mechanism overlaps a portion of one of the adjacent shearing machines on the second row (e.g., 1.5 inches) and a portion of another one of the adjacent shearing machines on the second row (e.g., 1.5 inches). Each cutting mechanism on the first row completely covers the space between adjacent shearing machines on the second row. (I can include a figure to explain if this is not clear)

The number of shearing machines on each row may be the same or different. Preferably, the number of shearing machines on each row is different. In one embodiment, the number of shearing machines on one row is one more than the number of shearing machines on the other row. The row that has more shearing machines may be the row that revitalizes a portion of the artificial turf field first before the other row revitalizes the same portion, which is the strut 125 that is closer to the first beam 107a. In particular, when the strut 125 closer to the beam 107a is configured to have 21 shearing machines and the strut 125 further from the beam 107a is configured to have 20 shearing machines (the "21-20 configuration"), the apparatus 100 provides best performance in revitalizing artificial turf fields compared to other configurations. This configuration produces a more uniform cut of the fibers and lead to more synthetic fibers being cut (all or almost all of the fibers the apparatus 100 comes across with). Thus, no efforts or little efforts are needed to ensure that the field is revitalized after the apparatus 100 finishes revitalizing the field or as the apparatus 100 is revitalizing the field. Applicant conducted various solutions and found, based on testing, that this approach provides the best performance.

The shearing machines 110 can be conventional sheep shearing machines, which operate in a similar manner to human hair clippers in that a power-driven toothed blade, known as a cutter, is driven back and forth over the surface of a comb. The comb may also be known as a clipper guide or a clipper guard. The blade and the comb may be collectively referred to as a cutting mechanism 110a. The shearing machine 110 may have a body 110b supporting the cutting mechanism 110a. When the shearing machines are aligned with respect to each other (regardless which row), the cutting mechanisms are also aligned with respect to each other. The cutting mechanisms of all the shearing machines 110 on both struts 125 may point to the same direction or toward the first beam 107a. When the shearing machines 110 are tilted on the support frame 105, the cutting mechanisms 110a may be tilted closer to the surface of the field compared to the body 110b (or further from the frame 105 or base 107). The shearing machines 110 may be individually powered. The shearing machines 110 may also operate individually, e.g., the operation of one shearing machine does not depend on another shearing machine or the remaining shearing machines. The shearing machines may have electrical power connected that are connected to a battery or generator that is carried or pulled by the vehicle. Optionally, the battery or generator may be placed on the support frame 105. The control for operating the shearing machines 110 may be mounted on the attachment member 120 and be electrically connected to the shearing machines 110. The control may turn on and off the shearing machines 110. The control may be further configured to adjust the height of the cutting mechanism, the shearing machine 120, and/or strut 125.

The shearing machines 110 or the cutting mechanisms are spaced above the surface of the artificial turf field at a distance for cutting a portion of the fibers in order to revitalize the fibers for renewed use of the field. The tip of the cutting mechanism or the cutting path is parallel or relatively parallel to the surface of the field. The distance between the cutting mechanisms and the surface of the field may be adjusted. The distance may be adjusted by moving the strut 125 to which the shearing machines 110 are attached to a different position or height on the base 107. In this adjustment, the distance may be changed without changing the position of the shearing machines 110 with respect to the strut 125. The distance may also be adjusted by moving the shearing machines 110 closer or further from the strut 125. In this adjustment, the distance may be changed without changing the position of the strut 125 with respect to the base 107. The distance may also be adjusted by moving both the position of the strut 125 with respect to the base 107 and the position of the shearing machines 110 with respect to the strut 125. The distance may also be adjusted by moving the support frame 105 to a different height. The support frame 105 may be moved to a different height by adding a spacer to each connection between the support frame 105 and the wheel 115 to increase the height of the support frame 105. For example, a spacer may be added between the cylindrical rod 142 having a larger diameter and the cylindrical rod 145 having a smaller diameter. The spacer may have a dimension ranging between 1/16 inch and 1 inch. Regardless the distance between the cutting mechanisms and the surface, the tip of the cutting mechanism or the cutting path is always relatively parallel to the surface of the field.

The distance between the cutting mechanisms and the surface determines a fiber length to be cut by the shearing machines. The distance between the cutting mechanisms and the surface is adjusted such that there is a portion of the remaining fiber extending above the infill or the topmost layer of the field after the shearing machine cuts the fiber. In the words, the trimmed fiber has a length that can extend above the infill or the topmost layer of the field. The remaining fiber or the trimmed fiber refers to a fiber that is cut by both rows of shearing machines. The distance between the cutting mechanisms and the surface may be adjusted such that the cutting mechanisms are spaced above the surface without contacting the infill or the topmost layer of the artificial turf except the fibers.

When the field is without any infill or other layers on the backing of the artificial turf (e.g., the artificial turf of the field has only a backing and fibers tufted into the backing and extending above the backing and nothing else), the distance between the cutting mechanisms and the surface is adjusted such that the remaining fiber has a length that can extend above the infill or the topmost layer of the artificial turf when the infill or other layers are applied to the backing.

If desired, in some embodiments, the distance between each cutting mechanism and the surface may be adjusted individually and the distance may be the same or different for each cutting mechanism. This may apply to any row or strut in the apparatus 100. Moreover, in some embodiments, the distance between the cutting mechanisms and the surface for one row (assuming all the cutting mechanisms in one row are equally spaced above the surface, e.g., 2 inch) may be the same as or different from the distance between the cutting mechanisms and the surface for another row (assuming all the cutting mechanisms in another row are equally spaced above the surface, e.g., 1 inch, 2 inch or 4 inch).

In some embodiment, the apparatus 100 is adapted such that the cutting mechanisms are at the lowest setting (e.g., where the distance between the cutting mechanism and the infill is the shortest among all the settings) of the shearing machine, are at a height that is not capable of sheering a fiber completely or almost completely (e.g., cannot cut the entire portion that extends above the infill or there is a portion remaining above the infill after the cut).

The cutting mechanism may have a cutting width extending in the same direction in which the struts 125 extend. The cutting width determines the number of fibers to be cut by the shearing machine. The cutting width may be adjusted to have different widths. The cutting width may be adjusted by replacing the cutting mechanism with another cutting mechanism that has a different cutting width. The cutting width may also be adjusted by adjusting the cutting width of the cutting mechanism if the cutting mechanism has such a capability. In that instance, the replacement of the cutting mechanism is not necessary. The cutting width is preferably three inch, but it may be other width such as four, six, or eight inch.

If desired, the apparatus 100 may include a single or multiple shearing machines that use one or more comb and cutter arrangement for a cutting mechanism. For example, instead of a conventional sheep shearing machine (e.g., having a three inch head), a larger comb and cutler (e.g., 4, 5, 10, and 20 inches) can be manufactured and installed on the support frame 105 to cut the fibers.

Lubricant may be applied to the cutting mechanism 110a to minimize the friction between the blades and the comb during movement. Lubricant may be applied directly to the cutting mechanism 110a, to the shearing machine that provides the lubricant to the cutting mechanism 110a, or to the strut 125 that is configured to direct the lubricant to the cutting mechanism 110a. Lubricant may also be applied to other locations of the apparatus 100. Lubricant may be oil or other material that has similar properties. In general, sheep shearing machines include three locations that are designed for applying lubricant to the machine, which supply lubricant to corresponding areas of a sheep shearing machine. Apparatus 100 may be configured to include (and carry) tubing, a reservoir (for holding the lubricant) and valves or other components for selectively lubricating the shearing machines (e.g., such as during operation).

Apparatus 100 can also be configured to include and carry control circuit (e.g., a switch) and electrical elements that are installed on the support frame 105 to turn the shearing machines "on" and to supply electricity to the machines. Apparatus 100 can also include circuitry including wires and switches that provide a kill switch for quickly shutting off the shearing machines. The kill switch can be positioned on a tractor that is pushing apparatus 100 so that the driver can operate the switch.

The wheels 115 can swivel on the field and allows the apparatus 100 to be moved in any direction. The wheels 115 may be installed directly under the base 107 such that the wheels 115 are between the base 107 and the surface of the field. The wheels 115 may also be installed on the base 107 in a manner such that they extend from the base 107 in a direction parallel to the surface of the field. In this manner, the base 107 is not above wheels 115. The wheels 115 may support the support frame 105 above the surface of the field (so the support frame 105 or shearing machines do not contact the surface on which the wheels roll). The wheels 117 may also be installed on the support frame 105, and the installed wheels 117 do not touch the surface of the field when the wheels 115 are in contact with or roll on the surface of the field. The wheels 117 may be installed at a location of the support frame 105 that can support the support frame 105 at a pivoted position or that can support the support frame 105 without the wheels 115 touching the surface of the field (e.g., the third beam 107c). The wheels 115 and 117 are foam tires or foam-filled tires.

Figure 3:
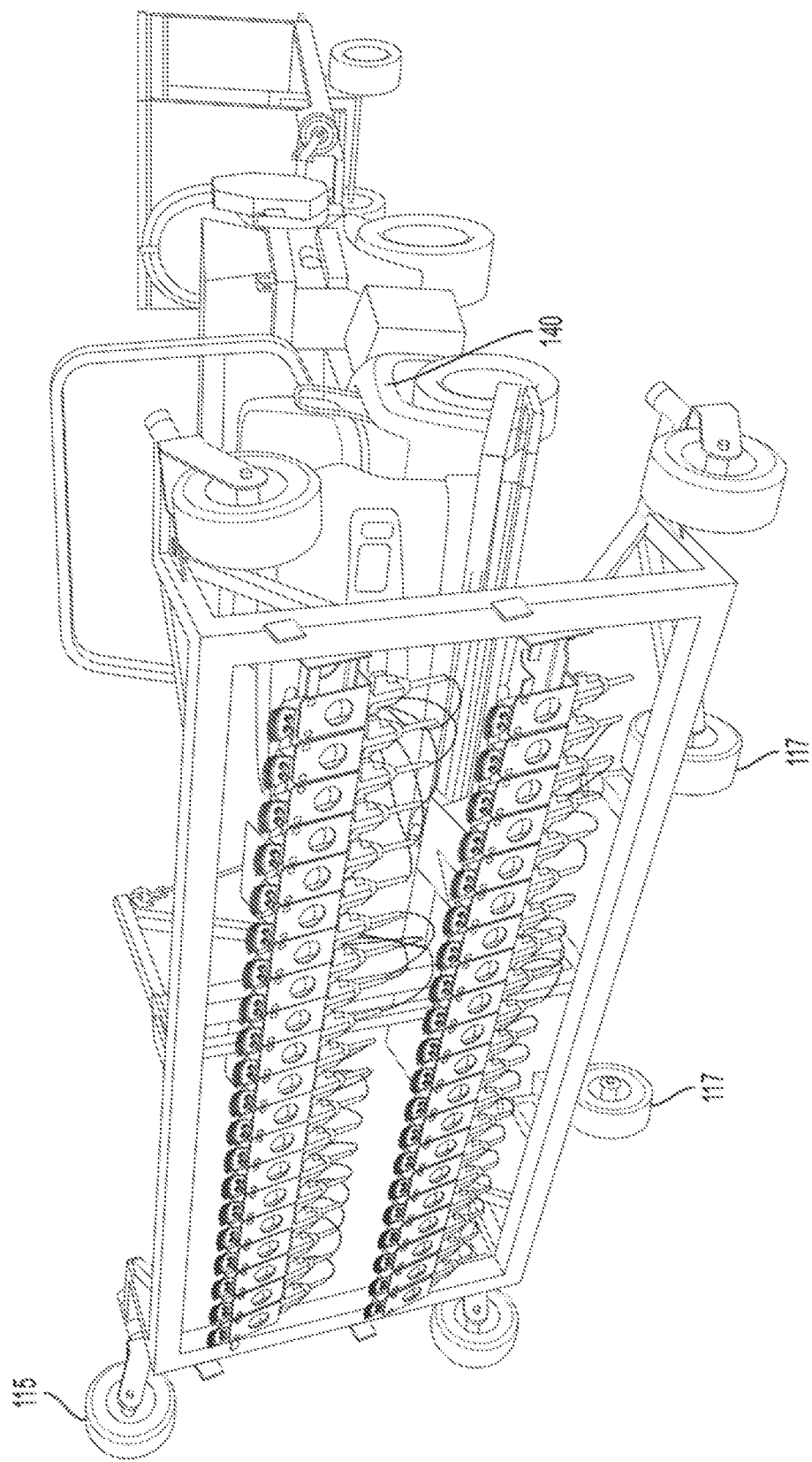
FIG. 3 depicts one embodiment of the apparatus for revitalizing artificial turf fields being supported by a different set of wheels in accordance with some embodiments of the present invention.
Figure 4:
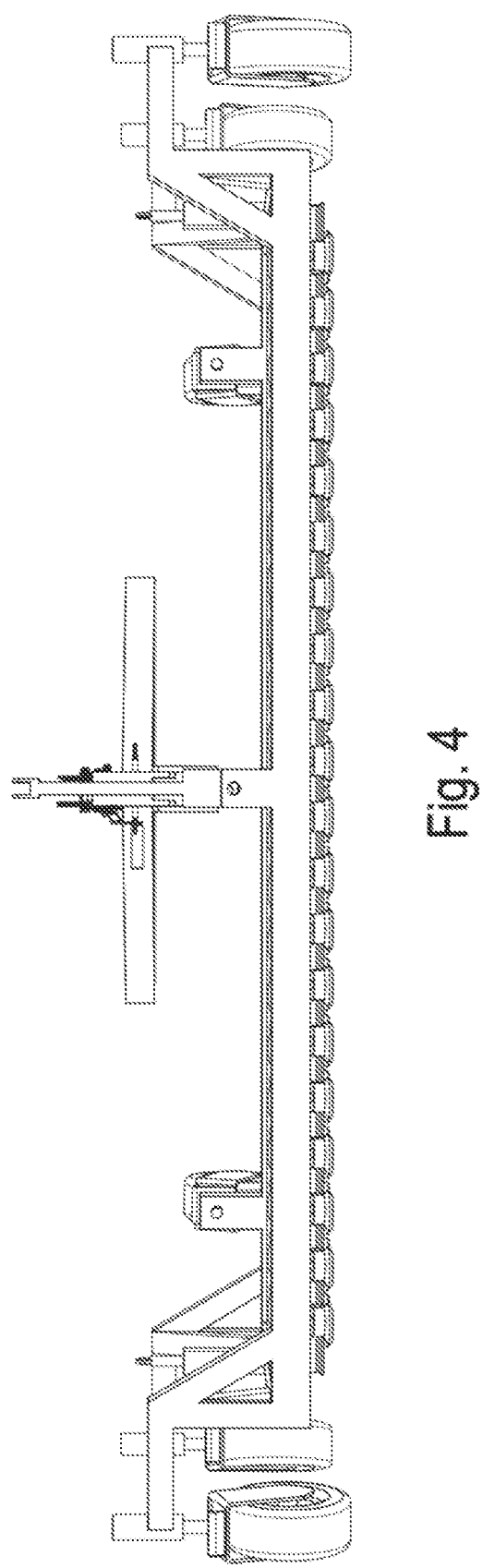
FIG. 4 depicts a front view of one embodiment of the apparatus for revitalizing artificial turf fields in accordance with some embodiments of the present invention.
Figure 5:
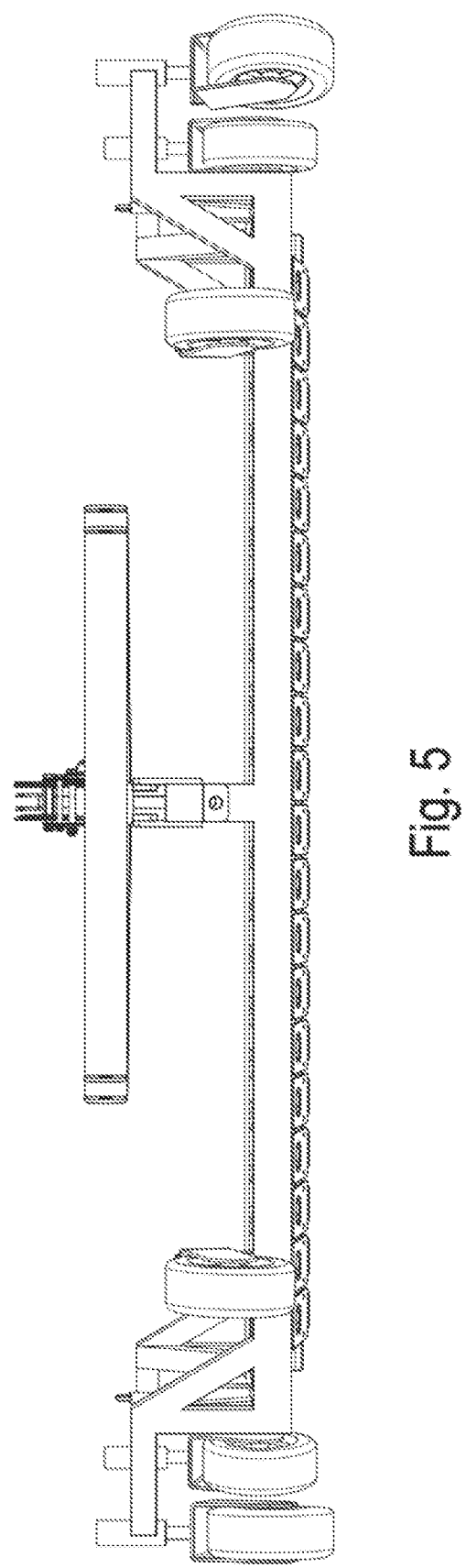
FIG. 5 depicts a rear view of one embodiment of the apparatus for revitalizing artificial turf fields in accordance with some embodiments of the present invention.
Figure 6:
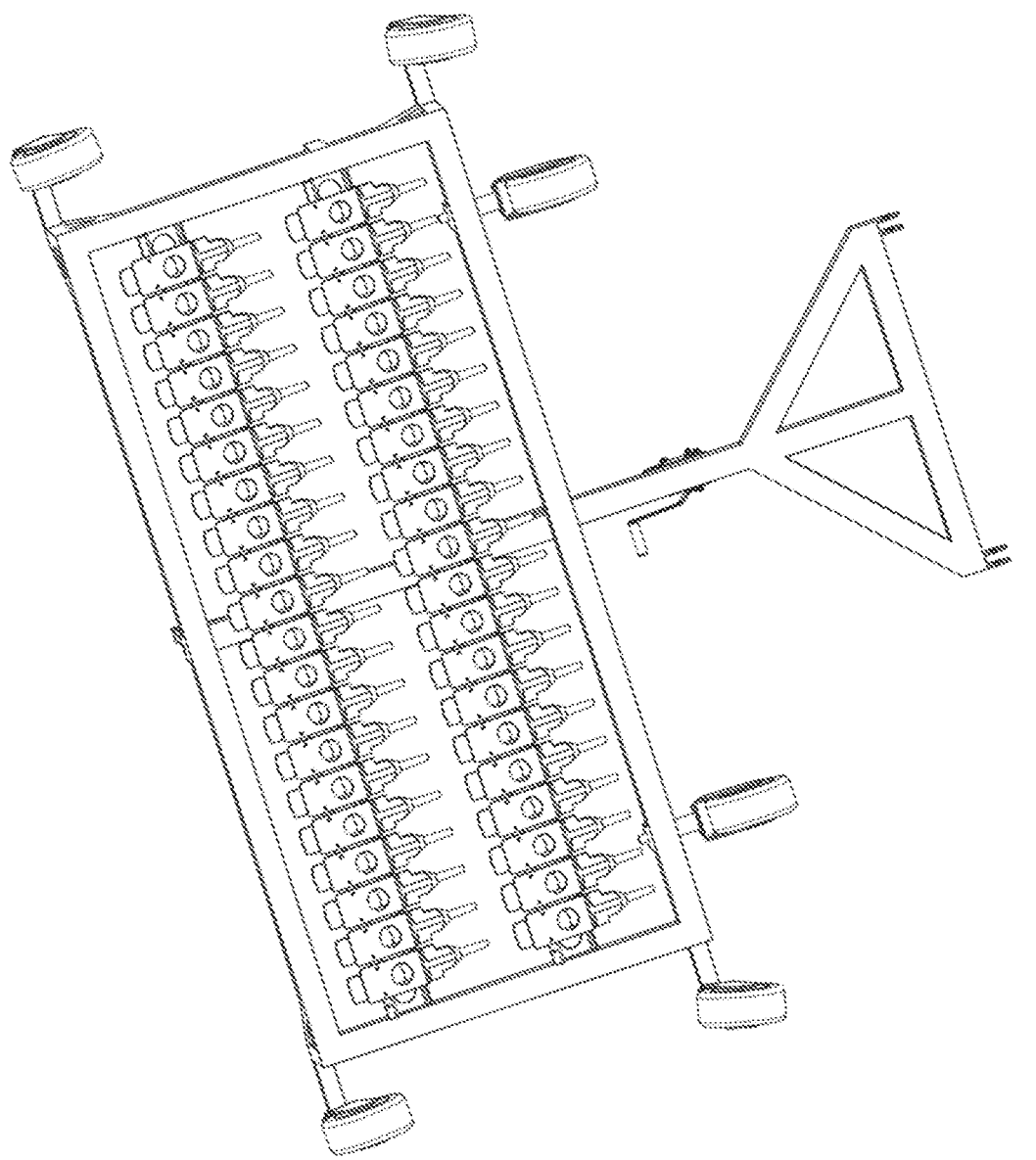
FIG. 6 depicts a bottom view of one embodiment of the apparatus for revitalizing artificial turf fields in accordance with some embodiments of the present invention.
Figure 7:
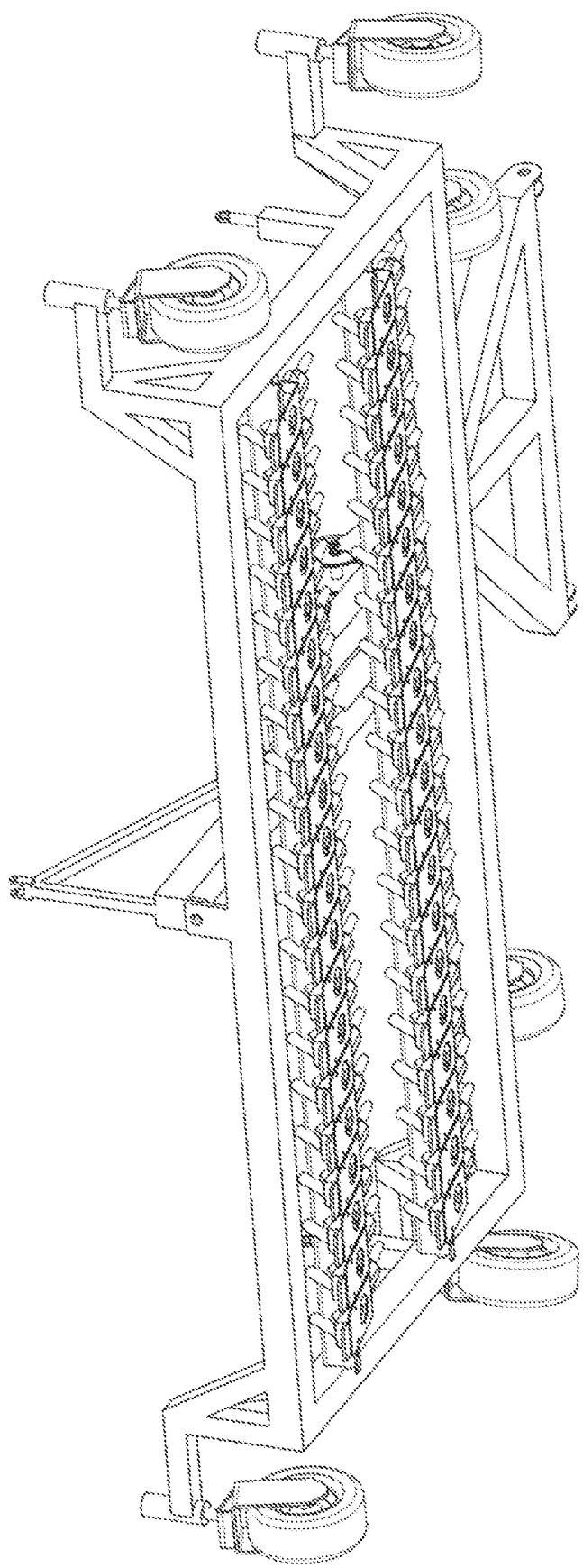
FIG. 7 depicts another bottom view of one embodiment of the apparatus for revitalizing artificial turf fields in accordance with some embodiments of the present invention.
Figure 8:
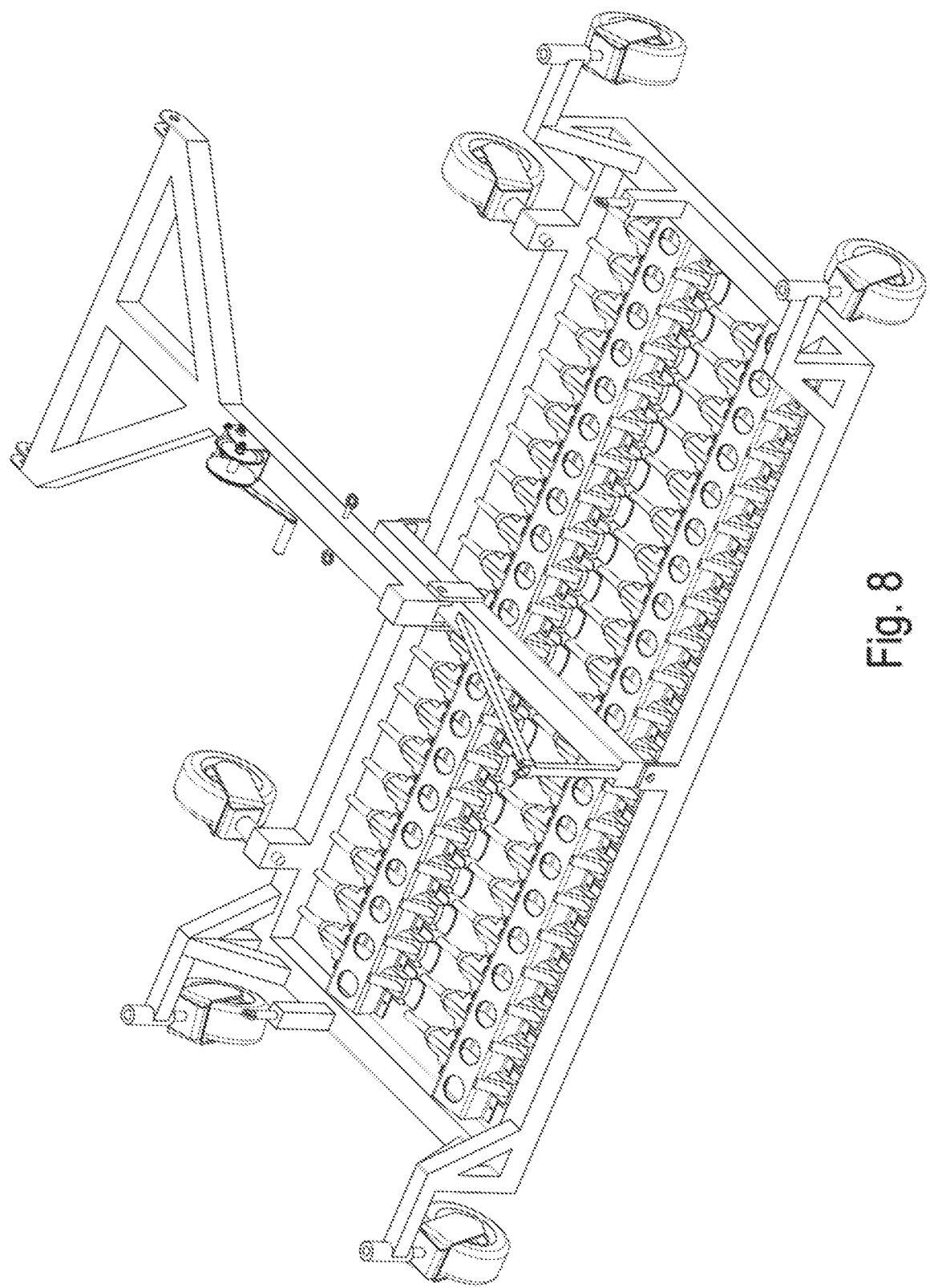
FIGS. 8-9 depict additional views of one embodiment of the apparatus for revitalizing artificial turf fields in accordance with some embodiments of the present invention.
Figure 9:
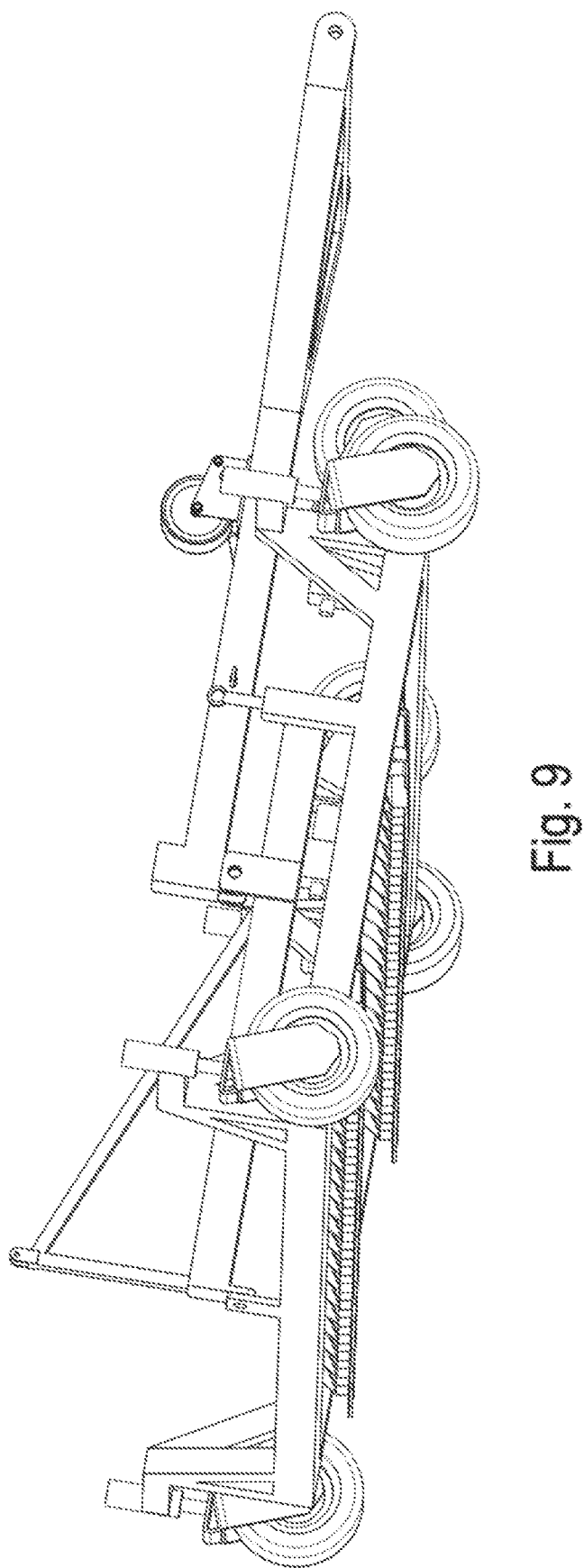

FIG. 3 depicts the apparatus 100 being supported by the wheels 117. The wheels 117 can also swivel on the field and allows the apparatus 100 to be moved in any direction. The apparatus 100 may be pulled toward the tractor 140 by the tractor 140 via the attachment member 120. The apparatus 100 may be pulled toward the tractor 140 to a pivoted position such that the wheels 115 are lifted above the surface of the field and the wheels 117 are supporting the apparatus 100. In the pivoted position, the third beam 107c may be closer to the surface of the field compared to the first beam 107a. The apparatus 100 may be moved on the field in the pivoted position by the tractor 140.

Referring back to FIG. 1, the attachment member 120 may be installed on the base 107 via a pair of brackets 122 that extend from the first beam 107a and the third beam 107c. The attachment member 120 may be installed on the base 107 in a direction perpendicular to or that extends between the first beam 107a and the third beam 107c. The attachment member 120 may comprise a first attachment beam 120a connecting the first beam 107a and the third beam 107c and a second attachment beam 120b connecting the first attachment beam and a vehicle (e.g., a tractor). The second attachment beam 120b may comprise an end connecting to the first attachment beam 120a and another end connecting to a vehicle. The end connecting to a vehicle may also be configured to allow an individual to maneuver the apparatus 100 at ease, such as handles or other similar structures. The control for operating the shearing machines may also be mounted to the same end. The vehicle or individual may exert force on that end toward the support frame 105 to move the apparatus 100 in the mowing direction X. While moving, the shearing machines 110 on each row reduce a portion of the fiber extending above the infill or the topmost layer of the artificial turf. The trimmed fiber has a length that can extend above the infill or the topmost layer of the artificial turf. On the first attachment beam 120a, the second attachment beam 120b, or the area where the first attachment beam 120a and the second attachment beam 120b are joined, there may be a mechanism configured to be connected to the vehicle and allow the vehicle to pull the apparatus 100 to the pivoted position.

FIGS. 4-9 are included to further illustrate one embodiment of the present invention.

In one approach to cut a portion of a fiber, the two rows of shearing machines may cut a part of that portion in one direction and may cut the remaining part of that portion in another direction to completely cut that portion, instead of cutting that entire portion only once using the two rows. In other words, the apparatus is pushed over the surface in one direction such as over the length of field and then the apparatus is turned around and pushed over the same surface in the opposite direction (after a height adjustment) to further cut the turf in that path in the field.

In some embodiments, the apparatus 100 may further comprise a vacuum and vacuum nozzles positioned at, above, or around the cutting mechanisms to suck away the cut or removed portions of the fibers as the apparatus rolls over the turf to cut the fibers. The vacuum may help straighten the fibers that are not yet being cut so the fibers can be cut uniformly. The vacuum should have a suction power that is strong enough to suck away the removed portions of the fibers but not the infill material or the topmost layer of the field.

Counterpart method embodiments would be understood from the above and the overall disclosure. Also, broader, narrower, or different combinations of the described features are contemplated, such that, for example features can be removed or added in a broadening or narrowing way.

Although the apparatus is described with respect fibers on the artificial turf or synthetic fibers, it is understood that the apparatus is also applicable to revitalizing real grass.

Conventionally, when a field needs to be replaced, it is removed completely and thrown out. The field is completely removed by cutting the fibers on the field down to the backing. Embodiments of the present invention are directed to apparatus and methods that do not cut the fibers down to the backing. The current standard for the height of a fiber is 2.5 inch and for the height of the infill is 1.75 inch. Embodiments of the present invention involve a longer fiber, e.g., between 3 inch and 4 inch, and a higher infill height, e.g., between 2.25 inch and 3.25 inch. After a period of time, e.g., after 8-10 years, 1 inch to 1.25 inch of the infill is removed and 1 inch to 1.125 inch of the fiber is cut. For example, if the fiber was 3.5 inch long, it would now be 2.5 inch long and the infill height would now be 1.75 inch.

The artificial turf field may be prepped before the apparatus is used on the fibers. A brush can be applied that is used to remove infill down to a certain height from infill (e.g., without removing all of the infill). The brush may also help to straighten the fibers. The fibers are supported by the infill that remains on the field and help to keep the fibers upright, which aids the cutting operation. Preferably, infill material that can damage, interfere, or dull the cutting mechanism is left at a layer below the surface of the infill that exist after the infill is removed in preparation for the cutting (or is not used in the infill). The infill removal can for example involve the removal of one inch of infill which can help to position the cutting path and the sheering heads to be at the height that can cut a desired length from the fibers as the apparatus rolls over the surface.

A conventional sheep shearing machine in the present arrangement and/or configuration as the cutting mechanism was found to provide the best performance based on testing that was conducted. The particular comb and cutter used in such machines provides the cutting mechanism. Other variations are also contemplated.

The words "may" or "can" are used in the present description to indicate that this is one embodiment but the description should not be understood to be the only embodiment. The word "configured" is also understood to include the meaning of adapted.

In some embodiments, a brush is not used or included on apparatus 100 for the purpose of brushing, straightening, pushing up the fiber. It is to be understood that the embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An apparatus for revitalizing artificial turf fibers on an artificial turf field comprising, a frame that supports a plurality of distinct sheep shearing machines, wherein the frame comprises two beams that are level and parallel to each other and two struts that are perpendicular to the beams and extend across between the beams;

the plurality of distinct shearing machines that are installed on the support frame and that are individually powered, wherein a first set of the plurality of the distinct shearing machines are mounted on a first one of the struts and a second set of the plurality of distinct shearing machines are mounted on a second one of the struts;

wherein the frame supports each sheep shearing machine during operation of the apparatus and positions the plurality of distinct sheep shearing machines to be distanced apart from each other, to be at a height from the artificial turf field for cutting worn portions of the artificial turf fibers, and to be angled towards the artificial turf field;

a plurality of wheels that support the frame and that are configured to roll over the artificial turf field to apply the sheep shearing machines to the artificial turf fibers to revive the artificial turf fibers of the artificial turf field; and a vacuum that straightens the worn portions of the artificial turf fibers that are to be cut, and that remove a set of the cut artificial turf fibers without removing an amount of infill of the artificial turf field.

2. The apparatus of claim 1 wherein the apparatus comprises tubing that supplies lubricant directly to a cutting mechanism of the plurality of distinct sheep shearing machines.

3. The apparatus of claim 1 wherein the plurality of distinct sheep shearing machines are positioned in two rows; and in one row, the first set of the plurality of sheep shearing machines are distanced to partially overlap a cutting path of the second set of the plurality of sheep shearing machines in another row, such that the cutting path has revitalized artificial turf fibers that have been cut to the same height from the first and second sets of the plurality of distinct shearing machines.

4. The apparatus of claim 1 further comprising a set of electrical cables for each sheep shearing machine, wherein the frame supports each set of electrical cables.

5. The apparatus of claim 1 wherein the apparatus is configured to allow the wheels to swivel to allow the apparatus to be moved in any direction.

6. The apparatus of claim 1 wherein the sheep shearing machines are aligned.

7. The apparatus of claim 1 wherein the apparatus is adapted to have an adjustable height.

8. The apparatus of claim 1 wherein the apparatus is adapted to be pushed or pulled over the artificial turf field.

9. The apparatus of claim 1 wherein the apparatus is adapted to position the sheep shearing machines on one row to be aligned with respect to each other and tilted at the same angle.

* * * * *